Dec. 11, 1934.  H. G. CARLSON  1,983,596
RAKE
Filed May 3, 1933
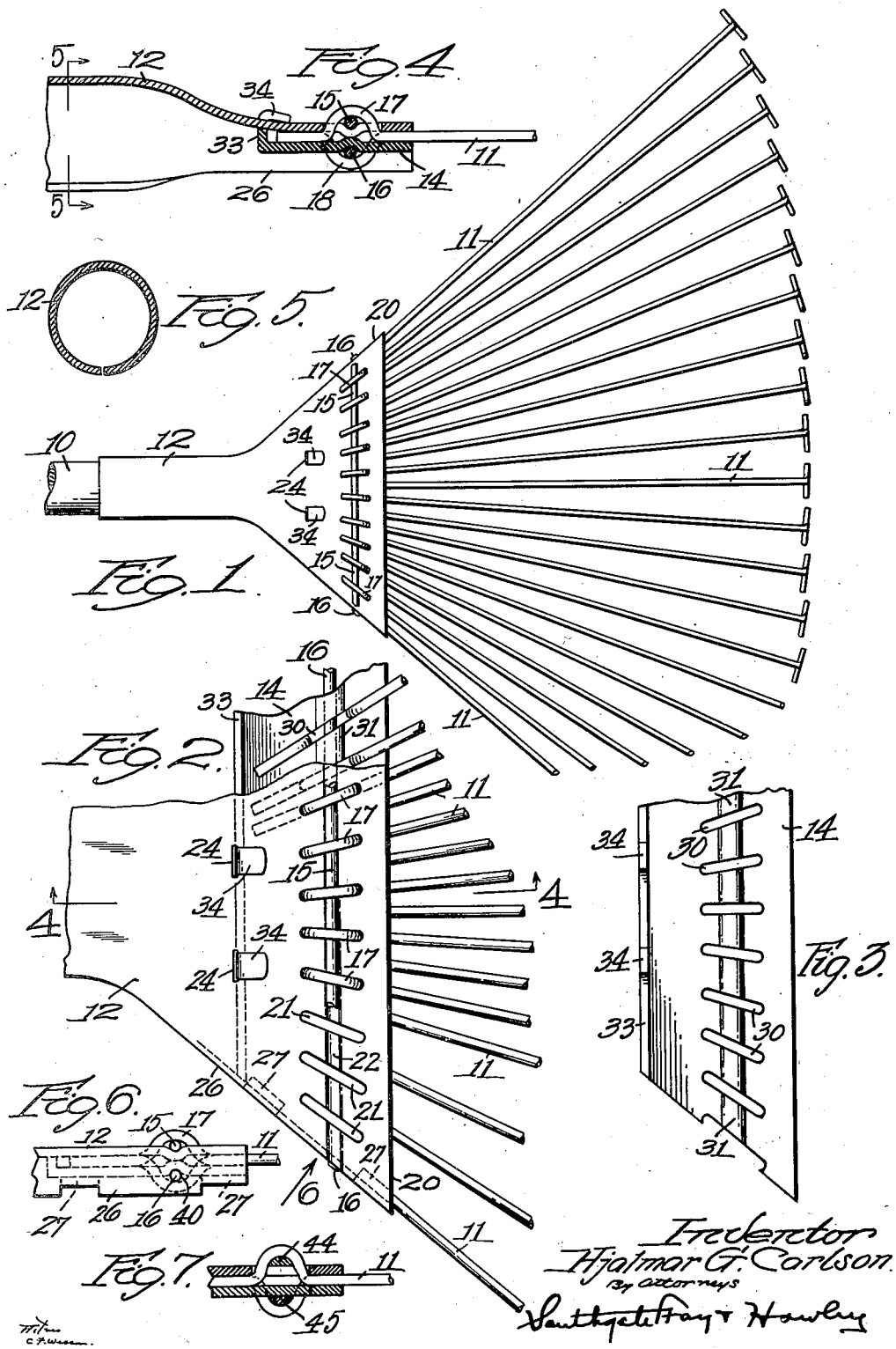

Patented Dec. 11, 1934

1,983,596

UNITED STATES PATENT OFFICE 1,983,596

RAKE

Hjalmar G. Carlson, Shrewsbury, Mass.

Application May 3, 1933, Serial No. 669,217

5 Claims. (Cl. 55—114)

This invention relates to a rake for light work such as cleaning lawns, and relates more particularly to rakes in which separate wire tines are used.

It is the general object of my invention to provide improved means for securing the tines in the rake head and for effectively retaining the tines in desired working position.

A further feature of the invention relates to the provision of locking members by the use of which bent or damaged tines may be conveniently removed and replaced.

My invention further relates to arrangements and combinations of parts which will be hereinafter described and more particularly pointed out in the appended claims.

A preferred form of the invention is shown in the drawing, in which

Fig. 1 is a plan view of my improved rake;

Fig. 2 is an enlarged plan view of certain of the parts shown in Fig. 1;

Fig. 3 is a partial plan view of the lower locking plate;

Fig. 4 is a sectional side elevation, taken along the line 4—4 in Fig. 2;

Fig. 5 is a detail sectional view, taken along the line 5—5 in Fig. 4;

Fig. 6 is a partial side elevation looking in the direction of the arrow 6 in Fig. 2, and Fig. 7 is a view similar to Fig. 4 but showing a slight modification.

Referring to the drawing, I have shown a rake comprising a handle 10, a plurality of wire tines 11, a head 12 for the tines 11, a lower locking plate 14 and upper and lower locking pins 15 and 16.

The tines 11 are each formed from a single piece of wire with the outer end offset and looped to provide a ground-engaging portion and with the inner end upwardly arched as indicated at 17 in Fig. 4, or downwardly arched as indicated at 18.

The head 12 is preferably formed from a single piece of sheet metal having one end bent to circular cross section as shown in Fig. 5 and closely fitting the end of the handle 10, to which the head may be secured in any convenient manner.

The head 12 also has a fan-shaped portion 20 provided with a plurality of outwardly divergent slots 21 and preferably with a depressed transverse groove 22. The head 12 is also provided with slots 24 for a purpose to be described and with depending side flanges 26 and ears 27.

The lower locking plate 14 (Fig. 3) is similarly provided with a plurality of outwardly divergent slots 30, a transversely extending groove 31, an up-turned edge flange 33, and upwardly projecting ears 34.

In assembling my improved rake, the upwardly arched portions of a series of tines 11 are inserted in the diverging slots 21 in the fan-shaped portion 20 of the head 12 and are secured therein by inserting the upper locking pin 15 as shown in Figs. 1 and 2.

The downwardly arched portions 18 of additional tines 11 are then inserted in the diverging slots 30 of the lower locking plate 14. The plate 14 and associated tines 11 are then assembled with the head 12 and are held in assembled relation while the lower locking pin 16 is inserted.

The pin 16 extends through openings 40 (Fig. 6) in the side flanges 26 of the head 12 and thus not only secures certain of the tines in assembled relation with the lower locking plate 14 but also secures these parts in assembled relation with the head 12.

When thus assembled, the ears 34 project upward through the slots 24 and may be bent over as indicated in Figs. 1, 2 and 4, thus additionally securing the parts together. Furthermore, the ears 27 of the side flanges 26 may be bent under the side edges of the locking plate 14, as indicated in Fig. 2, completing the secure assembling of the parts.

When thus assembled, the tines mounted in the lower locking plate 14 will be found to alternate with the tines secured in the head 12 and it will also be found that the tines project outward in fan-shaped relation as shown in Fig. 1.

If a tine becomes broken or is so badly damaged as to require replacement, the lower locking plate 14 may be removed by straightening the ears 27 and 34 and removing the lower locking pin 16, after which selected tines 11 may be removed and replaced.

I have thus provided a very strong and satisfactory construction in a lawn rake or similar article, by which a plurality of separate wire tines may be easily and firmly secured in operative position.

In Fig. 7 I have shown a slight modification in which the transverse grooves 22 and 31 are omitted from the head and locking plate and in which half-round locking wires 44 and 45 are used. Otherwise the construction is the same as that shown in Figs. 1 to 6.

Having thus described my invention and the advantages thereof, I do not wish to be limited to the details herein disclosed, otherwise than as set forth in the claims, but what I claim is:

1. In a rake, a head having a portion forming an upper locking plate provided with a series of slots, a plurality of tines each having an arched portion fitting one of said slots and projecting therethrough when assembled therewith, a locking member positioned alongside one face of said upper locking plate and extending through a plurality of said arched portions to prevent displacement of said tines, a lower locking plate having a series of slots to receive the arched portions of additional tines, a second locking member to secure said additional tines from displacement, and means to secure said lower locking plate to said head in substantially parallel relation to said upper plate.

2. In a rake, a head having a portion forming an upper locking plate provided with a series of slots, a plurality of tines each having an arched portion fitting one of said slots and projecting therethrough when assembled therewith, a locking member positioned alongside one face of said upper locking plate and extending through a plurality of said arched portions to prevent displacement of said tines, a lower locking plate having a series of slots to receive the arched portions of additional tines, a second locking member to secure said additional tines from displacement, and means to secure said lower locking plate to said head in substantially parallel relation to said upper plate, said additional tines alternating with said first-mentioned tines to form a continuous series of rake teeth.

3. In a rake, a head having a portion forming an upper locking plate provided with a series of slots, a plurality of tines each having an arched portion fitting one of said slots and projecting therethrough when assembled therewith, a locking member positioned alongside one face of said upper locking plate and extending through a plurality of said arched portions to prevent displacement of said tines, a lower locking plate having a series of slots to receive the arched portions of additional tines, a second locking member to secure said additional tines from displacement, and means to secure said lower locking plate to said head in substantially parallel relation to said upper plate, said additional tines alternating with said first-mentioned tines to form a fan-shaped rake, and said slots being outwardly divergent in said upper and lower locking plates.

4. In a rake, a head having a portion forming an upper locking plate provided with a series of slots, a plurality of tines each having an arched portion fitting one of said slots and projecting therethrough when assembled therewith, a locking member positioned alongside one face of said upper locking plate and extending through a plurality of said arched portions to prevent displacement of said tines, a lower locking plate having a series of slots to receive the arched portions of additional tines, a second locking member to secure said additional tines from displacement, and means to secure said lower locking plate to said head in substantially parallel relation to said upper plate, said upper and lower locking plates each having a transverse groove to receive its associated locking member.

5. In a rake, a head having a portion forming an upper locking plate provided with a series of slots, a plurality of tines each having an arched portion fitting one of said slots and projecting therethrough when assembled therewith, a locking member positioned alongside one face of said upper locking plate and extending through a plurality of said arched portions to prevent displacement of said tines, a lower locking plate having a series of slots to receive the arched portions of additional tines, a second locking member to secure said additional tines from displacement, and means to secure said lower locking plate to said head in substantially parallel relation to said upper plate, said head having depending side flanges with openings therein and said second locking member extending through said openings and additionally securing said head and locking plate in assembled relation.

HJALMAR G. CARLSON.